(12) United States Patent
Kawakami et al.

(10) Patent No.: US 10,656,021 B2
(45) Date of Patent: May 19, 2020

(54) REFLECTIVE DETECTION DEVICE

(71) Applicant: ROHM CO., LTD., Kyoto (JP)

(72) Inventors: Hideyuki Kawakami, Kyoto (JP);
Jae-Young Kim, Kyoto (JP);
Toshikazu Mukai, Kyoto (JP);
Kazuisao Tsuruda, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 15/617,313

(22) Filed: Jun. 8, 2017

(65) Prior Publication Data
US 2018/0003564 A1    Jan. 4, 2018

(30) Foreign Application Priority Data

Jun. 30, 2016   (JP) .................................. 2016-129588

(51) Int. Cl.
*G01J 5/20*    (2006.01)
*G01J 5/08*    (2006.01)

(52) U.S. Cl.
CPC .............. *G01J 5/20* (2013.01); *G01J 5/0809* (2013.01)

(58) Field of Classification Search
CPC .................................. G01J 5/20; G01J 5/0809
See application file for complete search history.

(56) References Cited

U.S. PATENT DOCUMENTS

| | | | |
|---|---|---|---|
| 9,182,281 B1* | 11/2015 | Savard ..................... | G01J 3/021 |
| 9,733,384 B2* | 8/2017 | Suzuki ................. | G01V 5/0016 |
| 2006/0029941 A1* | 2/2006 | Koo ...................... | C12Q 1/6825 |
| | | | 435/6.13 |
| 2009/0303480 A1* | 12/2009 | Tamada ..................... | G01J 3/02 |
| | | | 356/369 |
| 2011/0188525 A1* | 8/2011 | Claudon ................... | H01S 1/02 |
| | | | 372/34 |
| 2013/0076912 A1* | 3/2013 | Oda ..................... | G01N 21/3581 |
| | | | 348/164 |
| 2013/0181131 A1* | 7/2013 | Holenarsipur ........ | G01S 17/026 |
| | | | 250/338.1 |

(Continued)

FOREIGN PATENT DOCUMENTS

| | | |
|---|---|---|
| JP | 2012-217107 | 11/2012 |
| JP | 2013-092491 | 5/2013 |
| JP | 2016-102701 | 6/2016 |

*Primary Examiner* — Marcus H Taningco
(74) *Attorney, Agent, or Firm* — Hamre, Schumann, Mueller & Larson, P.C.

(57) ABSTRACT

A reflective detection device, includes: oscillation element oscillating a terahertz wave; exit part from which the terahertz wave exits; incident part to which the terahertz wave reflected from a detection target is incident; and detection element detecting the terahertz wave incident to the incident part, wherein the exit part and the incident part are disposed on one side in first direction and are spaced apart from each other in second direction with respect to the detection target, the terahertz wave exiting from the exit part travels to propagate from the exit part toward the incident part in the second direction along a direction toward the detection object in the first direction, and the terahertz wave incident to the incident part travels to propagate from the exit part toward the incident part in the second direction along a direction away from the detection target in the first direction.

36 Claims, 14 Drawing Sheets

(56) References Cited

U.S. PATENT DOCUMENTS

| | | | |
|---|---|---|---|
| 2013/0320216 A1* | 12/2013 | Aiko | G01B 11/303 250/349 |
| 2014/0139238 A1* | 5/2014 | Mukai | H03B 7/14 324/629 |
| 2014/0367316 A1* | 12/2014 | Saeedkia | B07C 5/344 209/577 |
| 2016/0033404 A1* | 2/2016 | Suzuki | G01N 21/3581 250/338.1 |
| 2016/0069673 A1* | 3/2016 | Takayanagi | G01B 11/0641 250/339.11 |
| 2018/0329110 A1* | 11/2018 | Hu | E21B 47/0005 |

* cited by examiner

REFLECTIVE DETECTION DEVICE

CROSS-REFERENCE TO RELATED APPLICATION

This application is based upon and claims the benefit of priority from Japanese Patent Application No. 2016-129588, filed on Jun. 30, 2016, the entire contents of which are incorporated herein by reference.

TECHNICAL FIELD

The present disclosure relates to a reflective detection device using a terahertz wave.

BACKGROUND

It is widely used to detect the presence or absence of liquid in an internal space of a tank or a pipe during production of industrial products or general use of various devices. In the related art, a so-called transmissive liquid detection device is disclosed. Further, in the related art, a so-called capacitive liquid detection device is disclosed.

In the transmissive liquid detection device, however, it is required to form a part of the tank or pipe with a transparent material through which detection light can transmit. In addition, when detecting the presence or absence of a liquid at a plurality of positions, the capacitive liquid detection device is required to ensure a sufficient distance from an adjacent liquid detection device in order to avoid interference of the adjacent liquid detection device.

SUMMARY

The present disclosure provides some embodiments of a nitride semiconductor device capable of detecting a detection target in more various forms.

According to one embodiment of the present disclosure, there is provided a reflective detection device, including: an oscillation element configured to oscillate a terahertz wave; an exit part from which the terahertz wave exits; an incident part to which the terahertz wave reflected from a detection target is incident; and a detection element configured to detect the terahertz wave incident to the incident part, wherein the exit part and the incident part are disposed on one side in a first direction and are spaced apart from each other in a second direction perpendicular to the first direction with respect to the detection target, the terahertz wave exiting from the exit part travels in an exit direction inclined with respect to the first direction so as to propagate from the exit part toward the incident part in the second direction along a direction toward the detection object in the first direction, and the terahertz wave incident to the incident part travels in an incident direction inclined with respect to the first direction so as to propagate from the exit part toward the incident part in the second direction along a direction away from the detection target in the first direction.

In some embodiments, the reflective detection device further includes a case in which the oscillation element and the detection element are incorporated.

In some embodiments, the terahertz wave penetrates the case.

In some embodiments, the case incorporates the oscillation element and the detection element in a sealed state.

In some embodiments, the case is made of a resin.

In some embodiments, the reflective detection device further includes a shielding part positioned between the exit part and the incident part in the second direction and configured to shield the terahertz wave.

In some embodiments, the shielding part has a first end positioned on another side in the first direction with respect to the exit part and the incident part.

In some embodiments, the shielding part has a second end positioned on the one side in the first direction with respect to the exit part and the incident part.

In some embodiments, the shielding part has an exit side surface facing the exit part side in the second direction and an incident side surface facing the incident part side in the second direction between the first end and the second end.

In some embodiments, a cross sectional shape of the shielding part along the first direction and the second direction is a rectangular shape in which the first end and the second end are a pair of sides facing each other.

In some embodiments, the cross sectional shape of the shielding part along the first direction and the second direction is a rectangular shape in which the first direction is a longitudinal direction.

In some embodiments, the cross sectional shape of the shielding part along the first direction and the second direction has a first portion extending in the second direction and including the first end and a second portion extending in the first direction and including the second end.

In some embodiments, the exit side surface and the incident side surface are parallel to each other.

In some embodiments, the cross sectional shape of the shielding part along the first direction and the second direction is a triangular shape in which the first end is one side and the second end is a vertex angle.

In some embodiments, the cross sectional shape of the shielding part along the first direction and the second direction has a pair of first portions spaced apart on both sides in the second direction and including the first end and a second portion having a pair of inclined side portions connected to the pair of first portions and a folded portion connecting the inclined side portions and including the second end.

In some embodiments, the exit side surface and the incident side surface are inclined so as to be spaced apart from each other in the second direction along a direction from one side in the first direction toward the other side in the first direction.

In some embodiment of the present disclosure, the shielding part is incorporated in the case.

In some embodiments, the reflective detection device further includes: an oscillation unit including the oscillation element; and a detection unit including the detection element and formed separately from the oscillation unit.

In some embodiments, the reflective detection device further includes a control unit formed separately from the oscillation unit and the detection unit.

In some embodiments, the exit part is configured by an exit side reflector that reflects the terahertz wave from the oscillation element so as to travel in the exit direction.

In some embodiments, the terahertz wave propagating from the oscillation element toward the exit side reflector travels along the first direction.

In some embodiments, the incident part is configured by an incident side reflector that reflects the terahertz wave traveling in the incident direction so as to be detected by the detection element.

In some embodiments, the terahertz wave propagating from the incident side reflector toward the detection element travels along the first direction.

In some embodiments, the detection target includes a tubular portion having an internal space and a fluid filled in the internal space.

In some embodiments, the reflective detection device further includes an oscillation module including the oscillation element and the exit part.

In some embodiments, the reflective detection device further includes a detection module including the detection element and the incident part.

In some embodiments, the oscillation element includes a resonant tunnel diode.

In some embodiments, the detection element includes a resonant tunnel diode.

In some embodiments, the detection element includes a Schottky barrier diode.

Other features and advantages of the present disclosure will become more apparent from the following detailed description given with reference to the accompanying drawings.

DETAILED DESCRIPTION

Embodiments of the present disclosure will be now described in detail with reference to the drawings.

Figure 1:
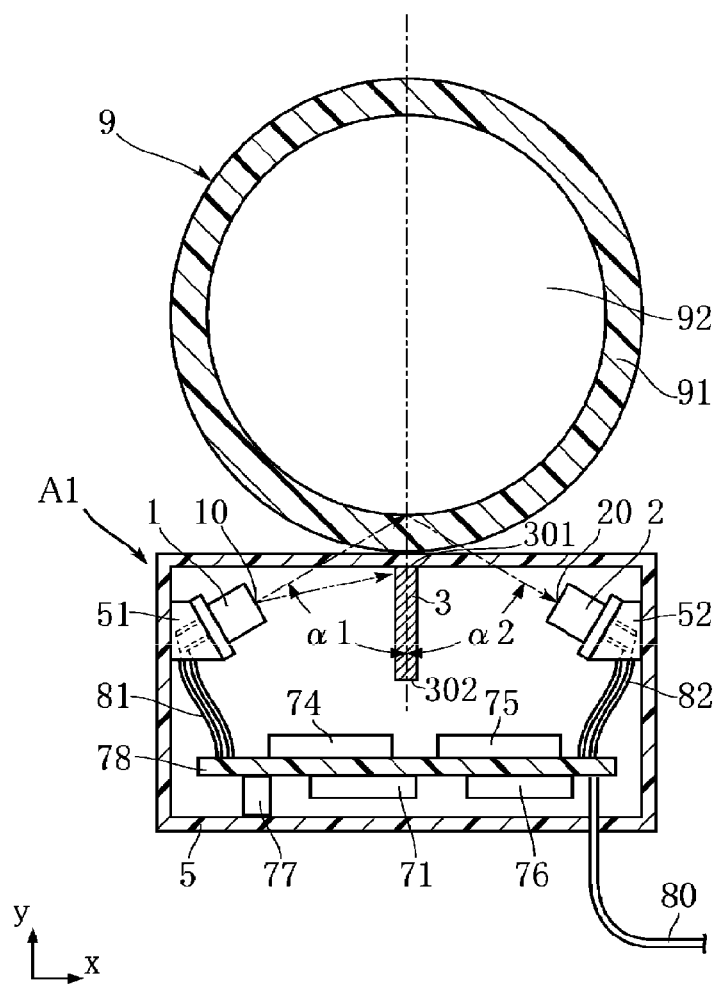
FIG. 1 is a cross sectional view illustrating a reflective detection device according to a first embodiment of the present disclosure.
Figure 2:
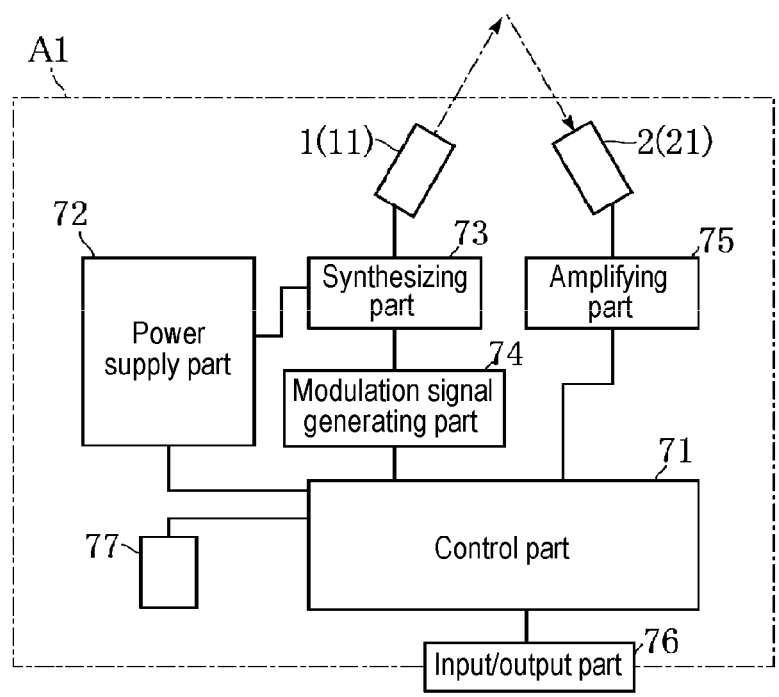
FIG. 2 is a system configuration diagram illustrating the reflective detection device of FIG. 1.

FIGS. 1 and 2 illustrate a reflective detection device according to a first embodiment of the present disclosure. A reflective detection device A1 of this embodiment includes an oscillation module 1, a detection module 2, a shielding part 3, a case 5, a control part 71, a power supply part 72, a synthesizing part 73, a modulation signal generating part 74, an amplifying part 75, an input/output part 76, a display lamp 77, and a control board 78. The reflective detection device A1 is a device that detects the state of a detection target 9 using a terahertz wave.

FIG. 1 is a cross sectional view illustrating the reflective detection device A1. FIG. 2 is a system configuration diagram illustrating the reflective detection device A1. In these drawings, the y direction corresponds to a first direction and the x direction corresponds to a second direction.

In the present disclosure, the terahertz wave refers to an electromagnetic wave that belongs to a frequency band of about 100 GHz to 10 THz, but appropriately includes an electromagnetic wave of a frequency band which exhibits the effect intended by the present disclosure.

The oscillation module 1 is a module that oscillates a terahertz wave, and incorporates an oscillation element 11 therein. The oscillation element 11 is not particularly limited as long as it can oscillate a terahertz wave, and in the present embodiment, there will be described a case where the oscillation element 11 includes a resonant tunnel diode as an example. In addition, the oscillation element 11 may have, for example, a slot antenna as a mechanism for allowing a terahertz wave to travel in a desired direction.

The resonant tunnel diode is a diode having a double barrier structure in which a quantum well layer made of a semiconductor having a small band gap is interposed between a pair of extremely thin barrier layers made of semiconductor having a large band gap. The resonant tunnel diode oscillates a terahertz wave using a negative resistance whose current decreases as an applied voltage increases. Such a resonant tunnel diode has an advantage that it can be formed to be relatively small as a device that oscillates a terahertz wave. Further, a specific configuration for incorporating the oscillation element 11 in the reflective detection device A1 is not particularly limited, and the oscillation module 1 having various configurations with the oscillation element 11 may be employed. The oscillation element 11 may be directly mounted on another component of the reflective detection device A1. In the following embodiment, there will be described a case where the oscillation module 1 having such a structure as illustrated in FIG. 3 is employed as an example.

Figure 3:
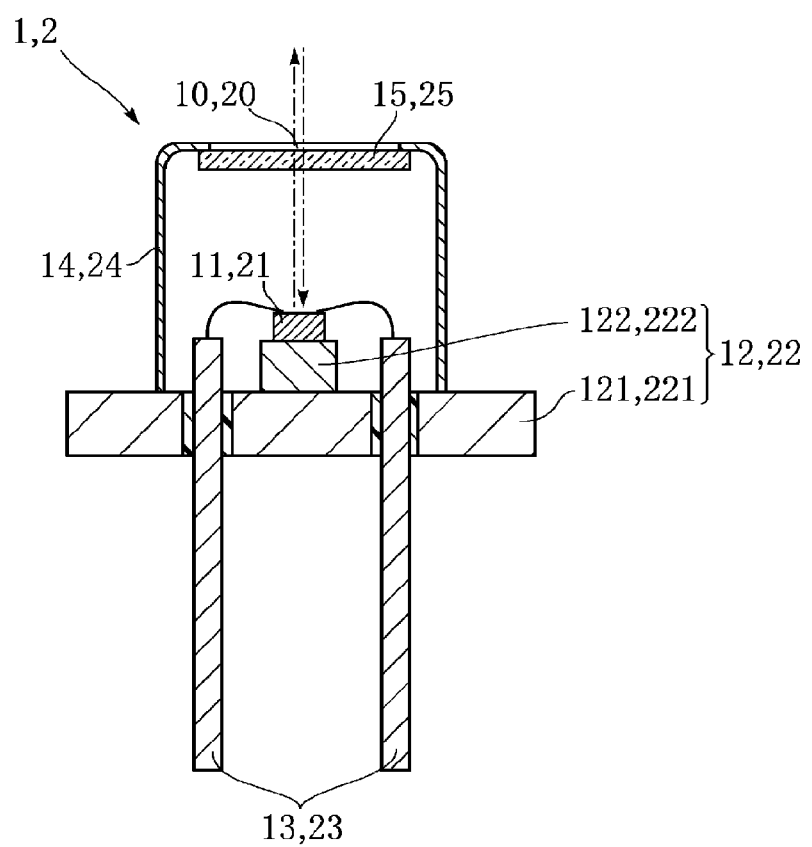
FIG. 3 is a cross sectional view illustrating an oscillation module and a detection module of the reflective detection device of FIG. 1.

FIG. 3 is a cross sectional view illustrating the oscillation module 1. The oscillation module 1 includes a base 12, a pair of leads 13, a cover 14, and a sealing plate 15, in addition to the oscillation element 11.

The base 12 supports the oscillation element 11 and is made of, for example, a metal such as an Fe alloy or the like. The illustrated base 12 has a stem 121 and a submount 122. The stem 121 is a plate-like part having a circular shape in a plane view, and the submount 122 is installed on an upper surface of the stem 121 and protrudes from the stem 121. The oscillation element 11 is mounted on an upper surface of the submount 122.

The pair of leads 13 are made of a metal such as Fe or Cu and form an external terminal of the oscillation module 1. The leads 13 are inserted through a through hole formed in the stem 121 with an insulator interposed therebetween. The leads 13 are electrically connected to the oscillation element 11 via, for example, a wire.

The cover 14 is a cup-shaped member attached to the stem 121 of the base 12 and having, for example, a circular shape in a plane view. The cover 14 is made of, for example, a metal such as Fe that shields a terahertz wave. A through hole is installed in the cover 14. The through hole serves to allow a terahertz wave to pass therethrough.

The sealing plate 15 closes the through hole of the cover 14. The sealing plate 15 is made of a material through which a terahertz wave transmits, and is made of, for example, a resin.

In the present embodiment, a portion through which a terahertz wave exits from the sealing plate 15 of the oscillation module 1 is an exit part 10. The exit part 10 is a portion where the terahertz wave exited therefrom exits to the detection target 9, without being intentionally reflected or refracted. However, the terahertz wave is inevitably slightly refracted when transmitting through other elements before it reaches the detection target 9 after exiting from the exit part 10. The exit part 10 is disposed on one side of the detection target 9 in the y direction. Unlike the present embodiment, in a case where the oscillation element 11 is directly mounted on another portion of the reflective detection device A1, the exit part 10 is a surface through which the terahertz wave exits from the oscillation element 11.

The detection module 2 is a module that detects a terahertz wave, and incorporates a detection element 21 therein. The detection element 21 is not particularly limited as long as it can detect a terahertz wave, and in the present embodiment, there will be described a case where the detection element 21 includes a resonant tunnel diode as an example. Further, as the detection element 21, for example, a Schottky barrier diode may be used instead of the resonant tunnel diode. In addition, the detection element 21 may have, for example, a slot antenna as a mechanism for detecting a terahertz wave traveling from a desired direction. A specific configuration for incorporating the detection element 21 in the reflective detection device A1 is not particularly limited, and the detection module 2 having various configurations with the detection element 21 may be employed. Further, the detection element 21 may be directly mounted on another component of the reflective detection device A1. In the following embodiment, there will be described a case where the detection module 2 having the structure illustrated in FIG. 3 is employed as an example.

As illustrated in FIG. 3, the detection module 2 may have the same configuration as that of the oscillation module 1. The illustrated detection module 2 includes a base 22, a pair of leads 23, a cover 24, and a sealing plate 25, in addition to the detection element 21. The same descriptions of the base 22, the pair of leads 23, the cover 24, and the sealing plate 25 as those of the base 12, the pair of leads 13, the cover 14, and the sealing plate 15 will be omitted. Similar to the base 12, the base 22 includes a stem 221 and a submount 222.

In the present embodiment, a portion through which a terahertz wave is incident to the sealing plate 25 of the detection module 2 is an incident part 20. The incident part 20 is a portion to which the terahertz wave traveling from the detection target 9 is incident, without being intentionally reflected or refracted. However, the terahertz wave is inevitably slightly refracted when transmitting through other elements before it reaches the incident part 20 from the detection target 9. The incident part 20 is disposed on one side of the detection target 9 in the y direction. Unlike the present embodiment, in a case where the detection element 21 is directly mounted on another portion of the reflective detection device A1, the incident part 20 is a surface through which the terahertz wave is incident to the detection element 21.

As illustrated in FIG. 1, the shielding part 3 is positioned between the exit part 10 and the incident part 20 in the x direction and shields a terahertz wave. The shielding part 3 is made of a material that shields a terahertz wave and is made of, for example, a metal.

Figure 4:
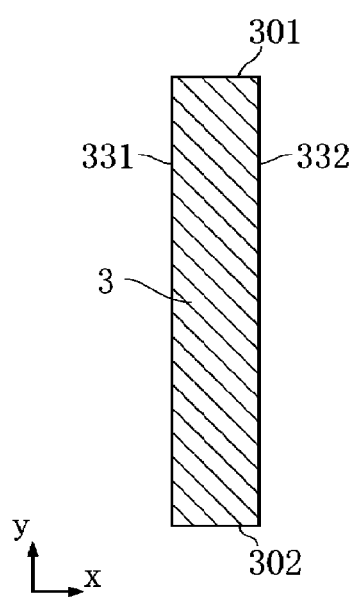
FIG. 4 is a cross sectional view illustrating a shielding part of the reflective detection device of FIG. 1.

As illustrated in FIG. 4, the shielding part 3 has a first end 301, a second end 302, an exit side surface 331 and an incident side surface 332. The first end 301 is positioned on the other side (on the detection target 9 side) in they direction with respect to the exit part 10 and the incident part 20. The second end 302 is positioned on one side in the y direction with respect to the exit part 10 and the incident part 20.

The exit side surface 331 is positioned between the first end 301 and the second end 302 and is a surface that faces the exit part 10 in the x direction. The incident side surface 332 is positioned between the first end 301 and the second end 302 and is a surface that faces the incident part 20 in the x direction. In the present embodiment, the cross sectional shape of the shielding part 3 along the x direction and y direction is a rectangular shape in which the first end 301 and the second end 302 are a pair of sides facing each other and is a rectangular shape in which the y direction is a longitudinal direction. Further, the exit side surface 331 and the incident side surface 332 are parallel to each other and extend along the y direction.

The case 5 accommodates the oscillation module 1, the detection module 2, the shielding part 3, a control part 71, the power supply part 72, the synthesizing part 73, the modulation signal generating part 74, the amplifying part 75, the input/output part 76, the display lamp 77, and the control board 78. In the present embodiment, the case 5 is made of a material resistant to a chemical change due to a chemical solution or the like, and is made of, for example, a resin.

The case 5 has an oscillation side support part 51 and a detection side support part 52. The oscillation side support part 51 supports the oscillation module 1. The detection side support part 52 supports the detection module 2. Thus, the oscillation module 1 is installed such that a terahertz wave exiting from the exit part 10 travels in an exit direction inclined at an exit angle $\alpha 1$ with respect to they direction so as to propagate from the exit part 10 toward the incident part 20 in the x direction along a direction toward the detection target 9 in the y direction. Further, the detection module 2 is installed such that the terahertz wave incident to the incident part 20 travels in an incident direction inclined at an incident angle $\alpha 2$ with respect to the y direction so as to propagate from the exit part 10 toward the incident part 20 in the x direction along a direction away from the detection target 9 in the y direction. The angles of the exit angle $\alpha 1$ and the incident angle $\alpha 2$ are not particularly limited, and in the illustrated example, both the exit angle $\alpha 1$ and the incident angle $\alpha 2$ are 60°. In some embodiments, the exit angle $\alpha 1$ and the incident angle $\alpha 2$ may be set to 40° to 60°.

The control part 71, the power supply part 72, the synthesizing part 73, the modulation signal generating part 74, the amplifying part 75, the input/output part 76, and the display lamp 77 are mounted on the control board 78 in the present embodiment. Further, the control part 71, the modulation signal generating part 74, the amplifying part 75, the input/output part 76, and the display lamp 77 are illustrated in FIG. 1 for the sake of convenience.

The control part 71 performs controlling such as oscillation of a terahertz wave by the oscillation module 1, detection of a terahertz wave by the detection module 2, transmission and reception of signals to and from an external device, and the like. The control part 71 is configured as, for example, a CPU.

The power supply part 72 performs a power supply function such as converting electric power received from the outside into electric power suitable for the oscillation module 1. The modulation signal generating part 74 is to generate a modulation signal having a wavelength based on a command from the control part 71. The synthesizing part 73 synthesizes a power current from the power supply part 72 and a modulation signal current from the modulation signal generating part 74. The amplifying part 75 is to amplify an output signal from the detection module 2. The input/output part 76 is a part that outputs a desired signal to the outside under the control of the control part 71. The display lamp 77 includes, for example, an LED chip, and is turned on in response to a command from the control part 71 depending on an operation or a state of the reflective detection device A1. For example, in a case where the case 5 is made of a translucent resin, when the display lamp 77 is turned on, it is possible to visually recognize lighting of the display lamp 77 from the outside through the case 5.

Further, in the present embodiment, the oscillation module 1 and the control board 78 are connected by means of an oscillation side cable 81. Further, the detection module 2 and the control board 78 are connected by means of a detection side cable 82. A main cable 80 extends from the input/output part 76 and is used to transmit and receive electric power or signals to and from the outside.

Figure 5:
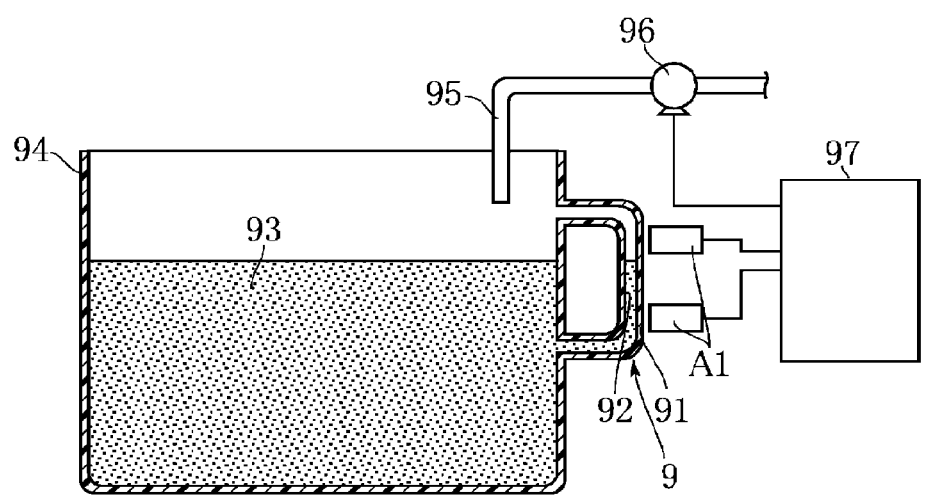
FIG. 5 is a system configuration diagram illustrating a usage example of the reflective detection device of FIG. 1.

FIG. 5 illustrates a usage example of the reflective detection device A1. Further, the illustrated example is one example showing s a usage aspect of the reflective detection device A1 and the applications of the reflective detection device A1 are not particularly limited.

The detection target 9 has a tubular portion 91 and a fluid tank 94. The fluid tank 94 is a tank that stores a fluid 93. The tubular portion 91 is connected to the fluid tank 94 and has an internal space 92. The fluid 93 stored in the fluid tank 94 flows into the internal space 92. Thus, the liquid surface of the fluid 93 in the fluid tank 94 and the liquid surface of the fluid 93 in the tubular portion 91 have substantially the same height. The tubular portion 91 and the fluid tank 94 are made of a material resistant to a chemical change due to the fluid 93 such as a chemical solution or the like. As such a material, for example, a resin is used. Further, in the present embodiment, the tubular portion 91 and the fluid tank 94 are made of a resin that is opaque to visible light.

In the illustrated example, two reflective detection devices A1 are installed near the tubular portion 91. In the drawing, an upper reflective detection device A1 is installed at a position corresponding to an upper limit of the liquid surface of the fluid 93. In the drawing, a lower reflective detection device A1 is installed at a position corresponding to a lower limit of the liquid surface of the fluid 93.

A supply pipe 95 forms a path for supplying the fluid 93 to the fluid tank 94. A supply pump 96 is a driving source for supplying the fluid 93. The control part 97 controls driving of the supply pump 96 based on a detection result from the reflective detection device A1.

Next, an operation of the reflective detection device A1 will be described.

FIG. 1 illustrates a state in which the internal space 92 of the tubular portion 91 is not filled with the fluid 93. In this state, a terahertz wave oscillated by the oscillation element 11 travels from the exit part 10 toward the detection target 9 at the angle of the exit angle $\alpha 1$ with respect to the y direction. Then, the terahertz wave transmits through the case 5 and the tubular portion 91 and is reflected in the inner surface of the tubular portion 91 because a difference of reflective indices between the resin and the air is relatively large. The reflected terahertz wave transmits through the tubular portion 91 and the case 5 at the angle of the incident angle $\alpha 2$ with respect to the y direction and is incident to the incident part 20. And then, the terahertz wave is detected by the detection element 21. Based on a detection signal from the detection element 21, the control part 71 determines that the terahertz wave has been detected, and transmits a signal to the outside.

Figure 6:
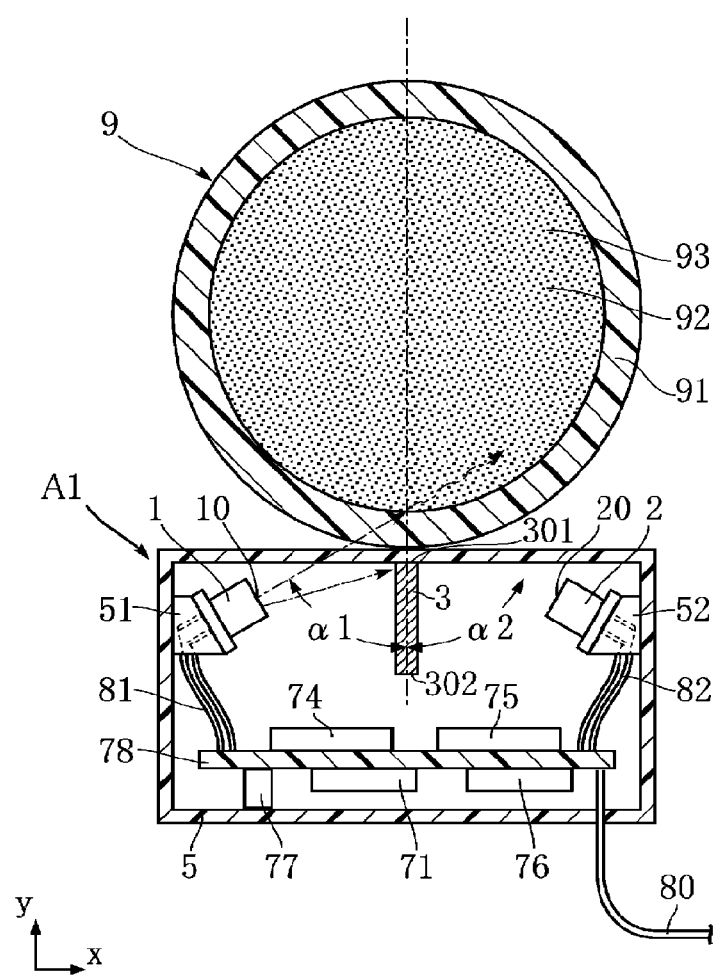
FIG. 6 is a cross sectional view illustrating a usage example of the reflective detection device of FIG. 1.

FIG. 6 illustrates a state in which the internal space 92 of the tubular portion 91 is filled with the fluid 93. In this state, since a difference of reflective indices between the resin and the liquid is relatively small after a terahertz wave exiting from the exit part 10 transmits through the case 5 and the tubular portion 91, the terahertz wave is absorbed by the fluid 93. Thus, the detection element 21 hardly detects the terahertz wave reflected by the detection target 9. Based on a detection signal from the detection element 21, the control part 71 determines that the terahertz wave has not been detected, and transmits a signal to the outside.

By determining whether the terahertz wave oscillated by the oscillation element 11 is detected by the detection element 21 in this manner, it is possible to detect the presence or absence of the fluid 93 in the internal space 92 of the tubular portion 91. Since the terahertz wave transmits through a resin or the like that is opaque to visible light, there is no need to form a portion of the tubular portion 91 of, for example, a transparent material. Further, since the terahertz wave is an electromagnetic wave having a relatively high directivity, there is a little possibility that the terahertz oscillated from one reflective detection device A1 affects detection of the other reflective detection device A1 as illustrated in FIG. 5. Thus, according to the reflective detection device A1, it is possible to detect the detection target 9 in more various forms with higher precision.

Figure 7:
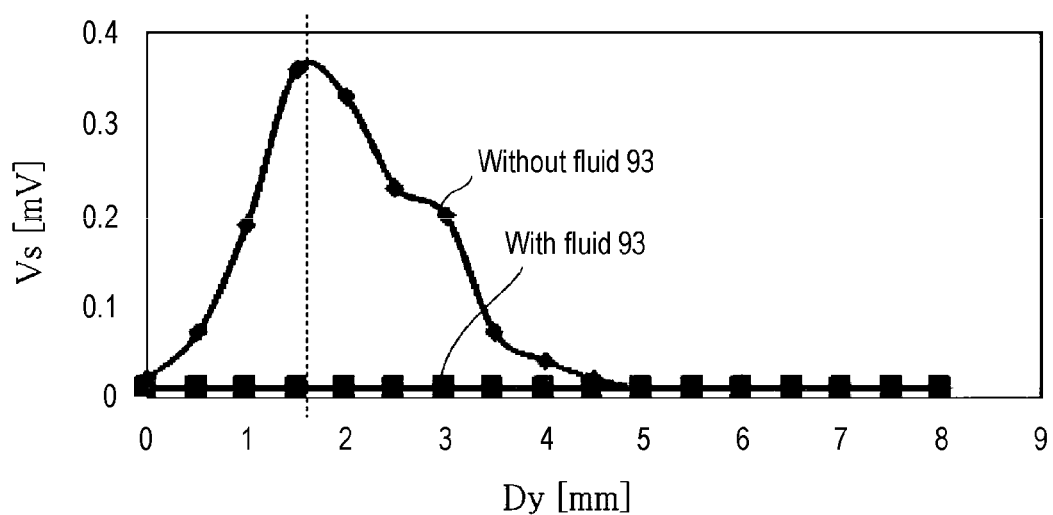
FIG. 7 is a graph illustrating a detection example by the reflective detection device of FIG. 1.

FIG. 7 illustrates a relationship between a distance Dy between the detection target 9 and the reflective detection device A1 in the y direction and a detection voltage Vs correlated with the detection strength in the detection element 21. When the fluid 93 is not present within the internal space 92 (the case of FIG. 1), the detection voltage Vs is maximized when the distance Dy is about 1.6 mm. This is correlated with the magnitudes of the exit angle $\alpha 1$ and the incident angle $\alpha 2$. Thus, it is desirable to dispose the reflective detection device A1 at a position in which the detection voltage Vs having a desirable magnitude can be obtained, depending on the magnitudes of the exit angle $\alpha 1$ and the incident angle $\alpha 2$ in the reflective detection device A1 and the sizes of the case 5 and the detection target 9. On the other hand, when the fluid 93 is present within the internal space 92 (the case of FIG. 6), the detection voltage Vs hardly increases significantly even if the distance Dy is changed. An installation condition of the reflective detection device A1 may be a condition under which the difference of the detection voltage Vs is large depending on the presence or absence of the fluid 93.

Figure 8:
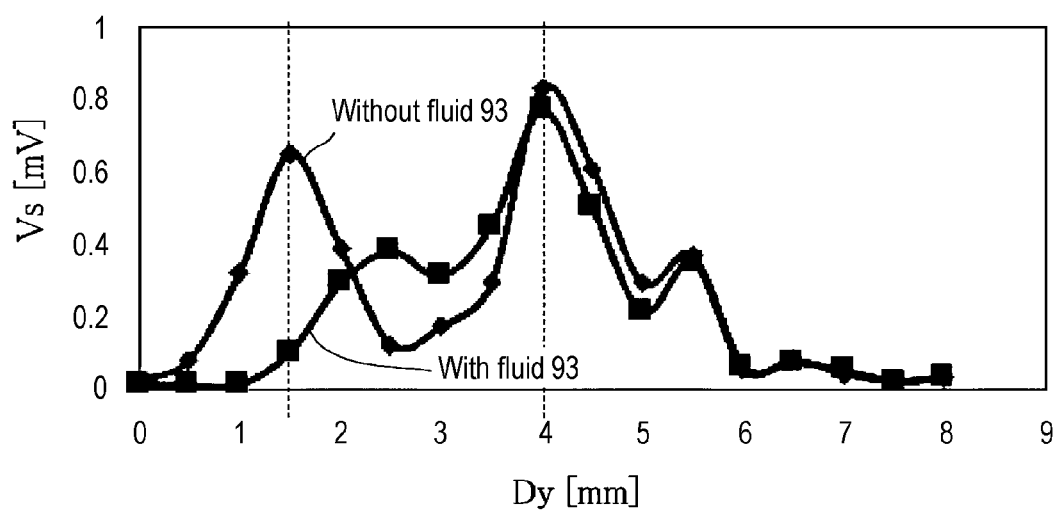
FIG. 8 is a graph illustrating a detection example by a reflective detection device without a shielding part.

FIG. 8 illustrates a relationship between the distance Dy between the detection target 9 and the reflective detection device A1 without the shielding part 3 in the y direction and the detection voltage Vs correlated with the detection strength in the detection element 21. As can be understood in this drawing, the detection voltage Vs is maximized when the distance Dy is about 4 mm, regardless of the presence or absence of the fluid 93. From this, it is supposed that the terahertz wave reflected in an outer surface of the tubular portion 91 or an inner surface of the case 5 is detected by the detection element 21. In the graph illustrated in FIG. 7, a reason why the peak of the detection voltage Vs does not exist when the distance Dy is about 4 mm is because the terahertz wave reflected in the outer surface of the tubular portion 91 or the inner surface of the case 5 is shielded by the shielding part 3. Since the shielding part 3 is present between the exit part 10 and the incident part 20, the shielding part 3 can shield a terahertz wave traveling along an unintentional path. Further, it is possible to further enhance the shielding effect of the shielding part 3 by the first end 301 on the detection target 9 side in the y direction with respect to the exit part 10 and the incident part 20. Since the second end 302 is present on the opposite side of the detection target 9 with respect to the exit part 10 and the incident part 20 in the y direction with respect to the exit part 10 and the incident part 20, it is possible to further enhance the shielding effect of the shielding part 3.

By employing a resonant tunnel diode as the oscillation element 11 and the detection element 21, the oscillation module 1 and the detection module 2 may be configured as smaller modules. In some embodiments, the oscillation module 1 and the detection module 2 may be integrally incorporated in the case 5. Further, in the reflective detection device A1, the oscillation module 1, the detection module 2, and elements for performing a control function and a power source function including the control part 71 and the power supply part 72 may be configured as an integrated device. It is desirable when the reflective detection device A1 is disposed at an appropriate position for detection with respect to the tubular portion 91 or the like. In addition, since the case 5 has a sealed structure made of a resin or the like, when the reflective detection device A1 is installed close to the tubular portion 91, it is possible to secure an appropriate operation although the reflective detection device A1 is exposed to the fluid 93 such as a chemical solution or the like.

FIGS. 9 to 14 illustrate modifications and another embodiment of the present disclosure. Further, in these drawings, the same or similar elements as those of the aforementioned embodiment will be denoted by the same reference numerals as those of the aforementioned embodiment.

Figure 9:
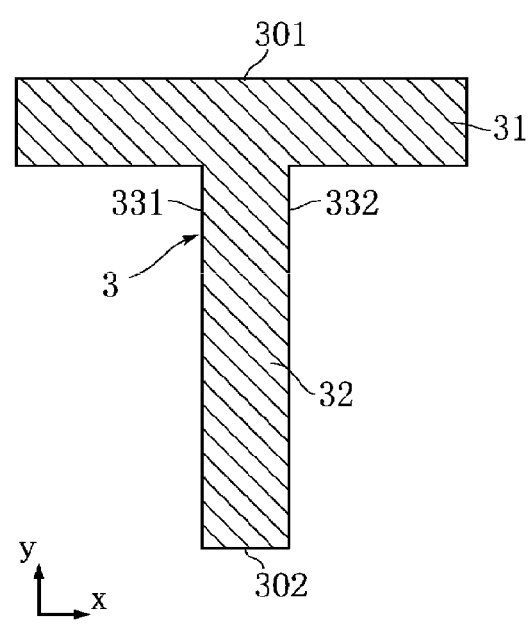
FIG. 9 is a cross sectional view illustrating a modification of a shielding part.
Figure 10:
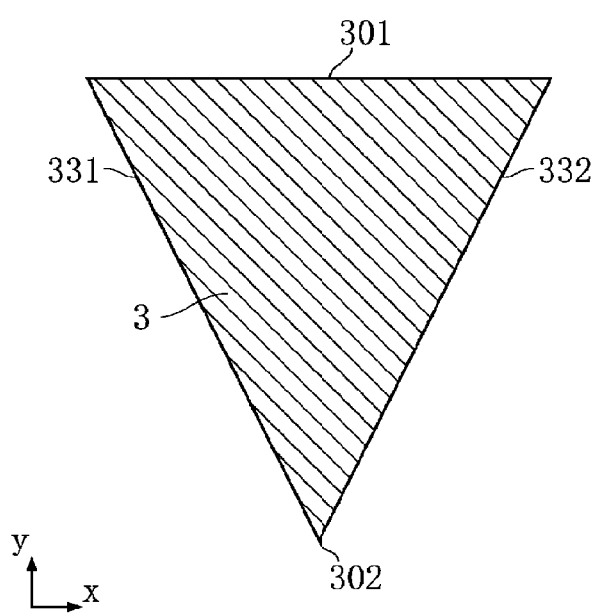
FIG. 10 is a cross sectional view illustrating another modification of a shielding part.
Figure 11:
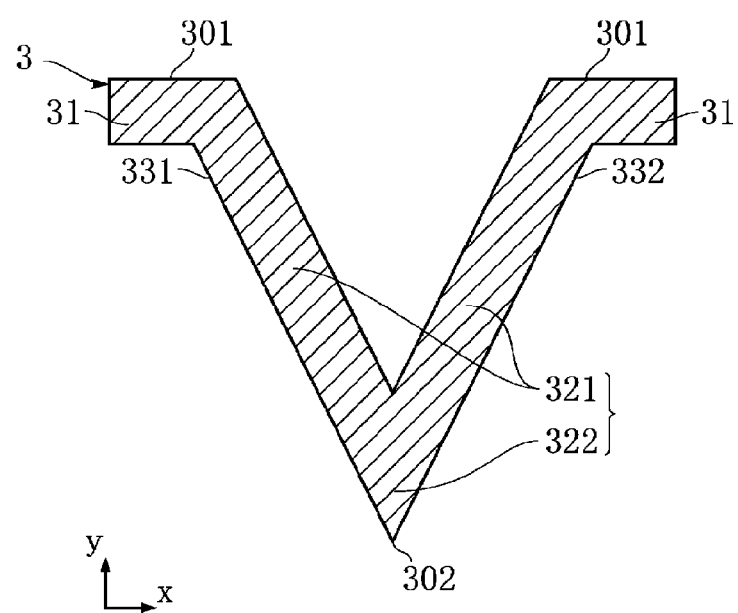
FIG. 11 is a cross sectional view illustrating another modification of a shielding part.

FIGS. 9 to 11 illustrate modifications of the shielding part 3.

A shielding part 3 illustrated in FIG. 9 has a first portion 31 and a second portion 32. The first portion 31 extends in the x direction and includes a first end 301. The second portion 32 extends in the y direction and includes a second end 302. The second portion 32 is connected to the center of the first portion 31 in the x direction.

A shielding part 3 illustrated in FIG. 10 has a triangular shape in which a first end 301 is one side and a second end 302 is a vertex angle in a cross sectional shape along the x direction and the y direction. In the present modification, an exit side surface 331 and an incident side surface 332 are inclined with respect to the y direction so as to be spaced apart from each other in the x direction along a direction from one side in the y direction toward the other side in the y direction.

A shielding part 3 illustrated in FIG. 11 has a pair of first portions 31 and a second portion 32. The pair of first portions 31 are disposed so as to be spaced apart from each other in the x direction and each includes a first end 301. The second portion 32 has a pair of inclined side portions 321 and a folded portion 322. The pair of inclined side portions 321 are inclined with respect to the y direction and are connected by the folded portion 322. The folded portion 322 includes a second end 302. Also in the present modification, an exit side surface 331 and an incident side surface 332 are inclined with respect to the y direction so as to be spaced apart from each other in the x direction along a direction from one side in the y direction to the other side in the y direction.

The shielding parts 3 illustrated in FIGS. 9 to 11 may be appropriately employed in the reflective detection device A1 and a following embodiment.

Figure 12:
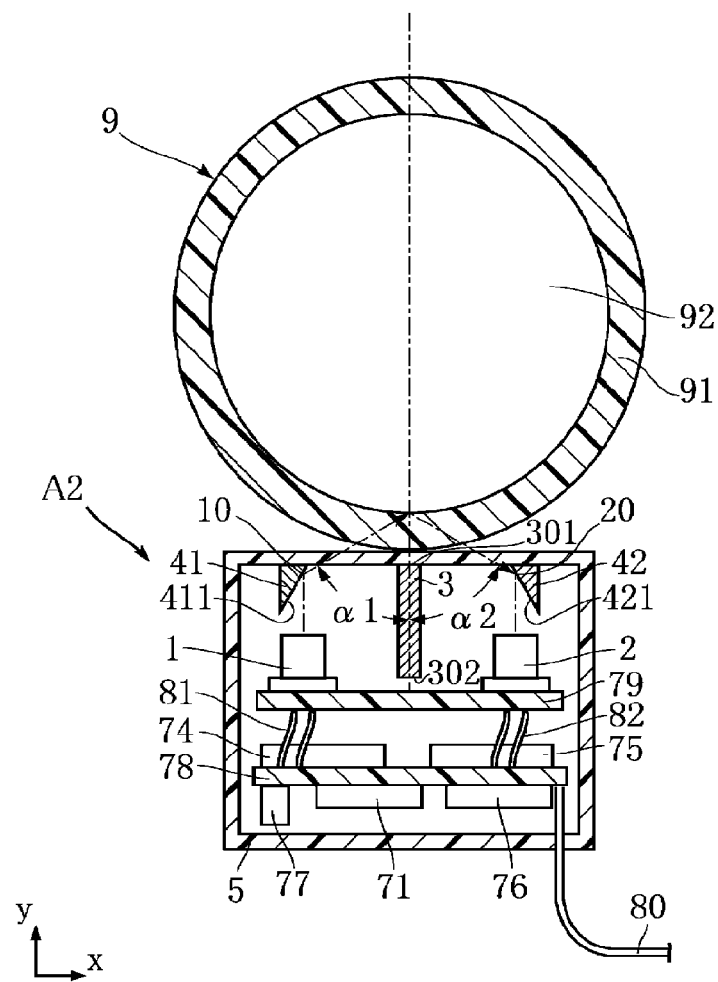
FIG. 12 is a cross sectional view illustrating a reflective detection device according to a second embodiment of the present disclosure.

FIG. 12 illustrates a reflective detection device according to a second embodiment of the present disclosure. A reflective detection device A2 of this embodiment includes an oscillation side reflector 41 and a detection side reflector 42.

The oscillation side reflector 41 reflects a terahertz wave from the oscillation element 11 so as to travel in an exit direction forming an exit angle $\alpha 1$ with respect to the y direction. A material of the oscillation side reflector 41 may be any material as long as it can reflect a terahertz wave and is made of, for example, a metal. The oscillation side reflector 41 has an oscillation side reflective surface 411. The oscillation side reflective surface 411 is a surface that reflects the terahertz wave. In this embodiment, a portion of the oscillation side reflective surface 411 that reflects the terahertz wave is an exit part 10.

The detection side reflector 42 reflects a terahertz wave traveling in an incident direction forming an incident angle $\alpha 2$ with respect to the y direction from the detection target 9 so as to be detected by the detection element 21. A material of the detection side reflector 42 may be any material as long as it can reflect a terahertz wave and is made of, for example, a metal. The detection side reflector 42 has a detection side reflective surface 421. The detection side reflective surface 421 is a surface that reflects the terahertz wave. In this embodiment, a portion of the detection side reflective surface 412 that reflects the terahertz wave is an incident part 20.

In this embodiment, the terahertz wave propagating from the oscillation element 11 (oscillation module 1) toward the oscillation side reflector 41 travels along the y direction. Further, the terahertz wave propagating from the detection side reflector 42 toward the detection element 21 (detection module 2) travels along the y direction. Therefore, the oscillation module 1 and the detection module 2 are mounted on the module board 79. The module board 79 is a board which has a surface oriented in the y direction and which is parallel in the x direction and the y direction. The oscillation module 1 and the detection module 2 are mounted on the module board 79 in a posture standing along the y direction.

Even with this embodiment, it is possible to detect the detection target 9 in more various forms with high precision. Further, by including the oscillation side reflector 41 and the detection side reflector 42, it is possible to set the exit angle $\alpha 1$ and the incident angle $\alpha 2$ to be larger without increasing a distance between the oscillation module 1 and the detection module 2 in the x direction. For example, the influence of the terahertz wave reflected from the outer surface of the tubular portion 91 can be suppressed as the exit angle $\alpha 1$ and incident angle $\alpha 2$ is larger. In addition, it is advantageous for reducing the distance between the oscillation module 1 and the detection module 2 in the x direction and it is desirable for reducing the size of the reflective detection device A2.

Figure 13:
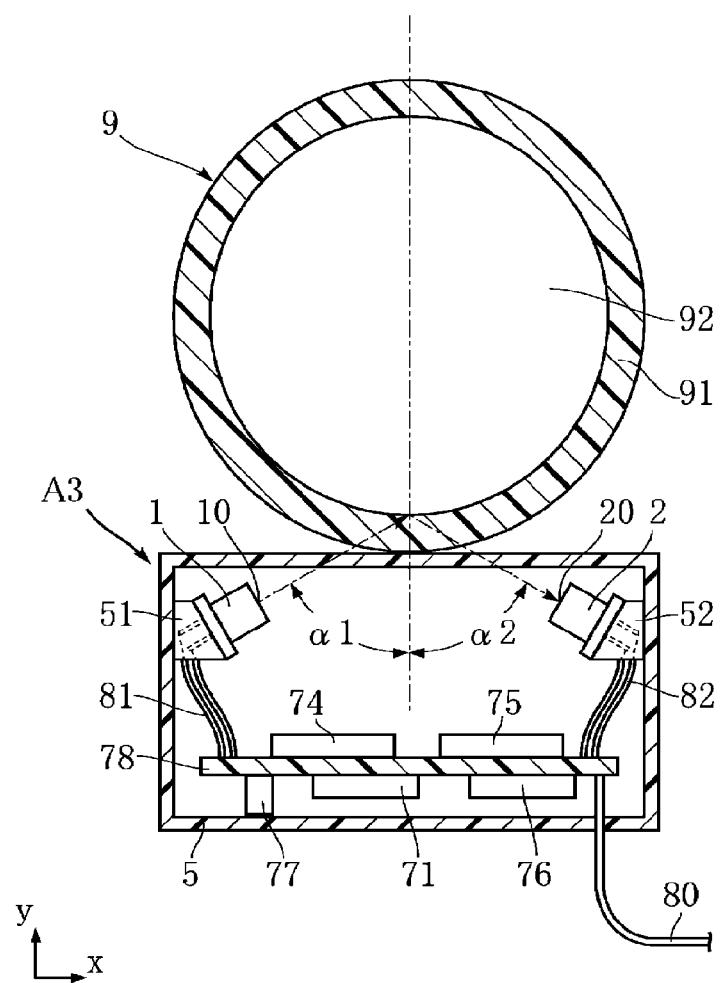
FIG. 13 is a cross sectional view illustrating a reflective detection device according to a third embodiment of the present disclosure.

FIG. 13 illustrates a reflective detection device according to a third embodiment of the present disclosure. A reflective detection device A3 of this embodiment has the same configuration as that of the aforementioned reflective detection device A1, except that it does not include the shielding part 3.

Since the reflective detection device A3 does not include the shielding part 3, for example, the detection behavior illustrated in FIG. 8 is obtained. That is, since the shielding function by the shielding part 3 does not exhibit, a region where the detection voltage V3 has a peak is present, regardless of the presence or absence of the fluid 93. However, since the exit angle α1 and the incident angle α2 are set to the aforementioned magnitude also in the reflective detection device A3, the terahertz wave reflected from the inner surface of the tubular portion 91 without the fluid 93 and the terahertz wave reflected from the outer surface of the tubular portion 91 travel along paths spaced apart from each other, avoiding overlap of the paths. Therefore, although the reflective detection device A3 does not have the shielding part 3, it is possible to perform a desirable detection by appropriately setting, for example, an installation position with respect to the detection target 9.

Figure 14:
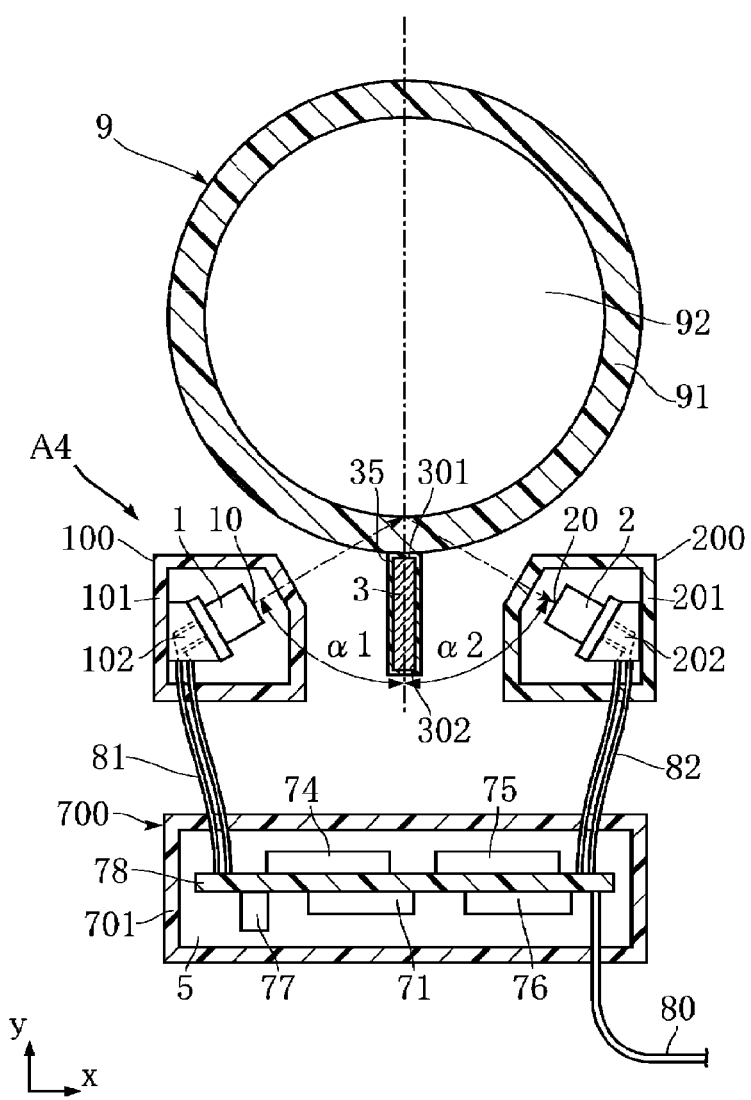
FIG. 14 is a cross sectional view illustrating a reflective detection device according to a fourth embodiment of the present disclosure.

FIG. 14 illustrates a reflective detection device according to a fourth embodiment of the present disclosure. A reflective detection device A4 of this embodiment is constituted by an oscillation unit 100 and a detection unit 200, a control unit 700, and a shielding part 3 which are formed as separate parts.

The oscillation unit 100 incorporates an oscillation module 1 (oscillation element 11) and includes an oscillation side case 101. The oscillation side case 101 is made of, for example, a resin, and accommodates the oscillation module 1 in a sealed state. The oscillation side case 101 has, for example, an oscillation side support part 102. The oscillation side support part 102 is the same member as the oscillation side support part 51 in the reflective detection device A1 and supports the oscillation module 1.

The detection unit 200 incorporates a detection module 2 (detection element 21) and includes a detection side case 201. The detection side case 201 is made of, for example, a resin, and accommodates the detection module 2 in a sealed state. The detection side case 201 includes, for example, a detection side support part 202. The detection side support part 202 is the same member as the detection side support part 52 in the reflective detection device A1 and supports the detection module 2.

The control unit 700 incorporates therein a control part 71, a power supply part 72, a synthesizing part 73, a modulation signal generating part 74, an amplifying part 75, an input/output part 76, a display lamp 77 and a control board 78, and includes a control case 701. The control case 701 is made of, for example, a resin, and accommodates the control part 71, the power supply part 72, the synthesizing part 73, the modulation signal generating part 74, the amplifying part 75, the input/output part 76, the display lamp 77 and the control board 78 in a sealed state. The oscillation unit 100 and the control unit 700 are connected by means of an oscillation side cable 81, and the detection unit 200 and the control unit 700 are connected by means of a detection side cable 82.

In this embodiment, the shielding part 3 is disposed between the oscillation unit 100 and the detection unit 200 in the x direction. In the illustrated example, the shielding part 3 is supported by the tubular portion 91. The shielding part 3 is made of, for example, a metal, and is entirely covered by a protective layer 35. The protective layer 35 is made of a material resistant to a corrosion due to the fluid 93 such as a chemical solution or the like, and is made of, for example, a resin. Also in this state, the first end 301 is positioned on the detection target 9 side in the y direction with respect to the exit part 10 and the incident part 20, and the second end 302 is positioned on the opposite side of the detection target 9 in they direction with respect to the exit part 10 and the incident part 20.

Even with this embodiment, it is possible to detect the detection target 9 in more various forms with high precision. Further, since the oscillation unit 100 and the detection unit 200 are configured as separate parts, it is possible to extensively set the positions of the exit part 10 and the incident part 20.

The reflective detection device according to the present disclosure is not limited to the aforementioned embodiments. A specific configuration of each part of the reflective detection device according to the present disclosure may be modified in design variously.

According to the present disclosure in some embodiments, it is possible to detect a detection target in more various forms.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A reflective detection device, comprising:
an oscillator including:
an oscillation element configured to oscillate a terahertz wave; and
an exit part from which the terahertz wave exits;
a detector including:
an incident part to which a first portion of the terahertz wave that has been reflected from an inner surface of a detection target is incident, and
a detection element configured to detect the first portion of the terahertz wave incident to the incident part; and
a shielding part made of a material that shields the terahertz wave,
wherein the exit part and the incident part are disposed on one side in a first direction with respect to the detection target and are spaced apart from each other in a second direction perpendicular to the first direction,
wherein the shielding part is positioned between the exit part and the incident part in the second direction to overlap with the exit part and the incident part when viewed in the second direction, and configured to shield a second portion of the terahertz wave that has not been reflected from the inner surface of the detection target,
wherein the teraheertz wave exiting from the exit part travels in an exit direction inclined with respect to the first direction so as to propagate from the exit part toward the incident part in the second direction along a direction toward the detection target in the first direction,
wherein the first portion of the terahertz wave incident to the incident part travels in an incident direction inclined with respect to the first directoin so as to propagate from the exit part toward the incident part in the second direction along a direction away from the detection target in the first direction,
wherein the oscillator, the detector and the shielding part are incorporated in a single case,
wherein a first end of the shielding part is disposed in the case and connected to a first inner surface of the case, the first inner surface being positioned between the detection target and the shielding part and facing a second inner surface of the cae in the first direction, wherein the oscillator is fixed to a third inner surface of the case, the third inner surface connecting the first inner surface and the second inner surface, and wherein the detector is fixed to a fourth inner surface of the case, the fourth inner surface connecting the first inner surface and the second inner surface and facing the third inner surface in the second direction.

2. The device of claim 1, wherein the first portion of the terahertz wave penetrates the case.

3. The device of claim 2, wherein the case incorporates the oscillator, the detector, and the shielding part in a sealed state.

4. The device of claim 3, wherein the case is made of a resin.

5. The device of claim 1, wherein the first end of the shielding part is positioned on another side in the first direction with respect to the exit part and the incident part.

6. The device of claim 5, wherein the shielding part has a second end positioned on the one side in the first direction with respect to the exit part and the incident part.

7. The device of claim 6, wherein the shielding part has an exit side surface facing the exit part side in the second direction and an incident side surface facing the incident part side in the second direction between the first end and the second end.

8. The device of claim 7, wherein a cross sectional shape of the shielding part along the first direction and the second direction is a rectangular shape in which the first end and the second end are a pair of sides facing each other.

9. The device of claim 8, wherein the cross sectional shape of the shielding part along the first direction and the second direction is a rectangular shape in which the first direction is a longitudinal direction.

10. The device of claim 8, wherein the cross sectional shape of the shielding part along the first direction and the second direction has a first portion extending in the second direction and including the first end and a second portion extending in the first direction and including the second end.

11. The device of claim 8, wherein the exit side surface and the incident side surface are parallel to each other.

12. The device of claim 7, wherein the cross sectional shape of the shielding part along the first direction and the second direction is a triangular shape in which the first end is one side and the second end is a vertex angle.

13. The device of claim 12, wherein the exit side surface and the incident side surface are inclined so as to be spaced apart from each other in the second direction along a direction from one side in the first direction toward the other side in the first direction.

14. The device of claim 7, wherein a cross sectional shape of the shielding part along the first direction and the second direction has a pair of first portions spaced apart on both sides in the second direction and including the first end and a second portion having a pair of inclined side portions connected to the pair of first portions and a folded portion connecting the inclined side portions and including the second end.

15. The device of claim 1, wherein the detector is formed separately from the oscillator.

16. The device of claim 15, further comprising a controller formed separately from the oscillation and the detection.

17. The device of claim 1, wherein the exit part is configured by an exit side reflector configured to reflect the terahertz wave from the oscillation element so as to travel in the exit direction.

18. The device of claim 17, wherein the teraherz wave propagating from the oscillation element toward the exit side reflector travels along the first direction.

19. The device of claim 17, wherein the incident part is configured by an incident side reflector configured to reflect the first portion of the terahertz wave traveling in the incident direction so as to be detected by the detection element.

20. The device of claim 19, wherein the first portion of the terahertz wave propagating from the incident side reflector toward the detection element travels along the first direction.

21. The device of claim 1, wherein the detection target includes a tubular portion having an internal space and a fluid filled in the internal space.

22. The device of claim 1, wherein the oscillation element includes a resonant tunnel diode.

23. The device of claim 1, wherein the detection element includes a resonant tunnel diode.

24. The device of claim 1, wherein the detection element includes a Schottky barrier diode.

25. The device of claim 1, further comprising a board, on which a controller for controlling the oscillator and the detector is mounted, connected to the second inner surface of the case.

26. The device of claim 25, wherein the controller is configured to determine a presence of absence of a fluid in an internal space of the detection target based on whether the first portion of the terahertz wave is detected by the detection element.

27. The device of claim 1, wherein the oscillator and the detector are, respectively, disposed to diagonally face the first inner surface, respectively.

28. A reflective detection device, comprising:
an oscillator including:
an oscillation element configured to oscillate a terahertz wave, and
an exit part from which the terahertz wave exits;
a detector including:
an incident part to which the terahertz wave reflected from a detection target is incident, and
a detection element configured to detect the terahertz wave incident to the incident part;
a board, on which a controller for controlling the oscillator and the detector is mounted, disposed on one sside in a first direction with respect to the exit part and the incident part; and
a shielding part disposed between the eit part and the incident part in a second direction that is perpendicular to the first direction, to overlap with the exit part and the incident part when viewed in the second direction, and configured to shield a second portion of the terahertz wave that has not been reflected from the inner surface of the detectuion target,
wherein the exit part and the incident part are disposed between the detection target and the board in the first direction, and are spaced apart from each other in the second direction, wherein the oscillator, the detector, the board and the shielding part are incorporated in a single case,
wherein a first end of the shielding part is disposed in the case and connected to a first inner surface of the case, the first inner surface being positioned between the dectection target and the shielding part,
wherein the board is connected to a second inner surface of the case, the second inner surface being positioned to face the first inner surface in the first direction, wherein the oscillator is fixed to a third inner surface of the case, the third inner surface connecting the first inner surface and the second inner surface, and wherein the detector is fixed to a fourth inner surface of the case, the fourth inner surface connecting the first inner surface and the second inner surface and facing the third inner surface in the second direction.

29. The reflective detection device of claim 28, wherein the controller is configured to:

control the oscillator such that the terahertz wave exiting from the exit part travels in an exit direction inclined with respect to the first directioin to propagate from the exit part toward the incident part when viewed in the second direction and toward the detection target when viewed in the first direction; and control the detector such that the first portion of the terahertz wave incident to the incident part travels in an incident diretion inclined with respect to the first direction to propagate from the exti part toward the incident prt when viewed in the second direction and away fform the detection target when viewed in the first direction.

30. The reflective detection device of claim 28, wherein a power supply, a synthesizer, a modulation signal generator and an amplifier are further mounted on the board, and wherein the power supply is configured to supply power to the oscilltaion element, the synthesizer is configured to synthesize the power supplied from the power supply, the modulation signal gererator is configured to generate a modulation signal based on a command from the controller, and the amplifier is configured to amplify an output signal from the detection element.

31. The reflective detection device of claim 30, wherein the board includes a first surface and a second surface facing opposite sides in the first direction, and wherein the modulation signal generator and the amplifier are mounted on the first surface.

32. The reflective detection device of claim 31, wherein the controller is moounted on the second surface of the board.

33. The device of claim 28, wherein the controller is configured to determine a presence or absence of a fluid in an internal space of the detection target based on whether the first portion of the terahertz wave is detected by the detection element.

34. The device of claim 28, wherein the oscillator and the detector are, respectively, disposed to diagonally face the first inner surface, respectively.

35. The device of claim 28, wherein the shielding part is spatially apart from the board in the case.

36. The device of claim 28, wherein the board is spatially apart from the second inner surface, and connected to the second inner surface via a display lamp, and wherein the controller is disposed between the board and the second inner surface in the first direction, and disposed between the oscillator and the detector in the second direction.

* * * * *